H. D. CAMMACK & E. V. VERHEYEN.
HEADLIGHT ADJUSTING MEANS.
APPLICATION FILED MAR. 8, 1916.

1,206,666.

Patented Nov. 28, 1916.
2 SHEETS—SHEET 1.

WITNESSES

INVENTORS
HOWARD D. CAMMACK
EDWARD V. VERHEYEN
BY
ATTORNEYS

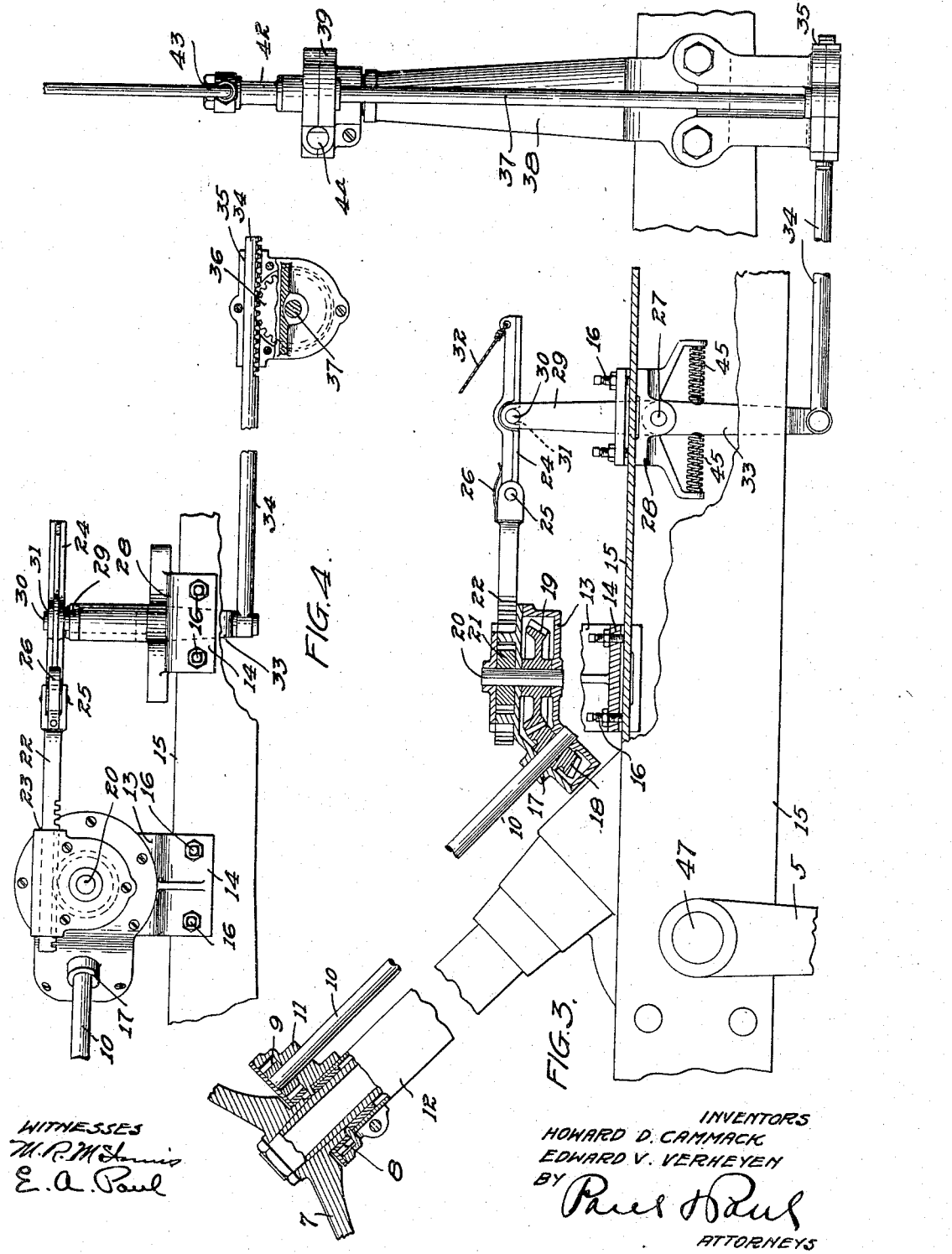

UNITED STATES PATENT OFFICE.

HOWARD D. CAMMACK AND EDWARD V. VERHEYEN, OF MINNEAPOLIS, MINNESOTA, ASSIGNORS, BY MESNE ASSIGNMENTS, TO UNIVERSAL AUTO SUPPLY CO., OF MINNEAPOLIS, MINNESOTA, A CORPORATION OF MINNESOTA.

HEADLIGHT-ADJUSTING MEANS.

1,206,666. Specification of Letters Patent. Patented Nov. 28, 1916.

Application filed March 8, 1916. Serial No. 82,848.

*To all whom it may concern:*

Be it known that we, HOWARD D. CAMMACK and EDWARD V. VERHEYEN, citizens of the United States, residents of Minneapolis, county of Hennepin, State of Minnesota, have invented certain new and useful Improvements in Headlight-Adjusting Means, of which the following is a specification.

The object of our invention is to provide means controlled from the steering wheel of a power propelled vehicle for adjusting the headlights to throw the rays of light in the direction the wheels are turned.

A further object is to provide a mechanism which can be disconnected during the day from the steering wheel.

Other objects of the invention will appear from the following detailed description.

The invention consists generally in various constructions and combinations, all as hereinafter described and particularly pointed out in the claims.

Figure 1:
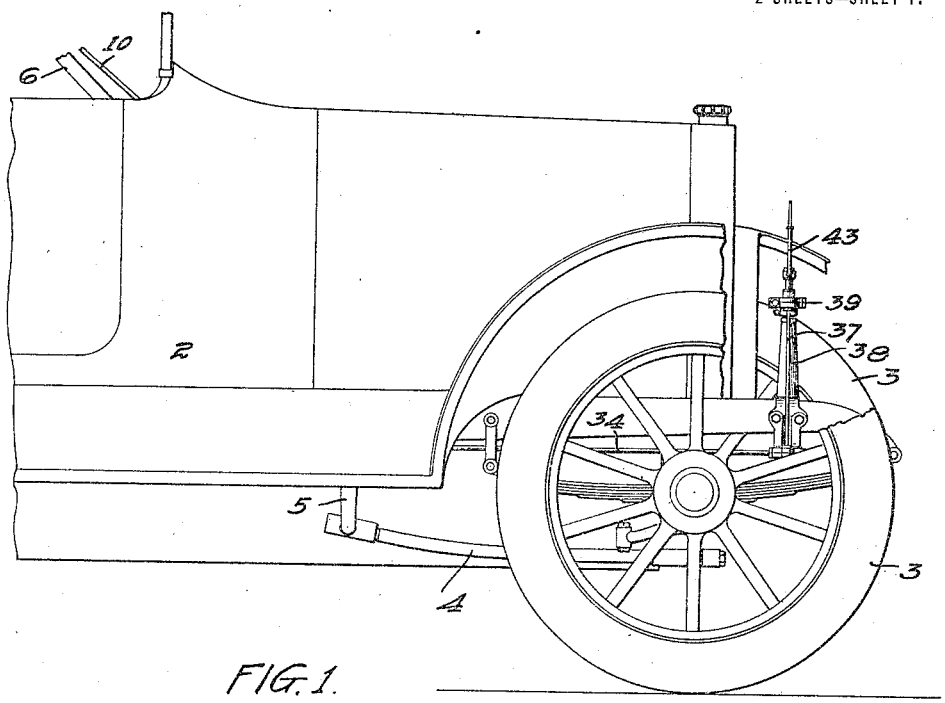
Figure 2:
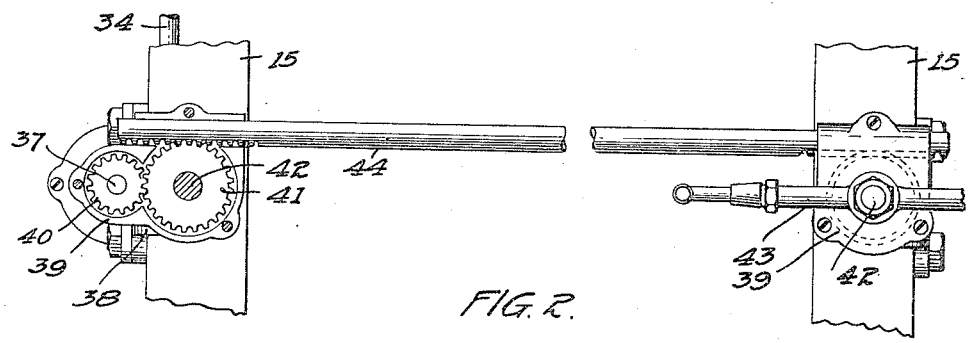
Figure 5:
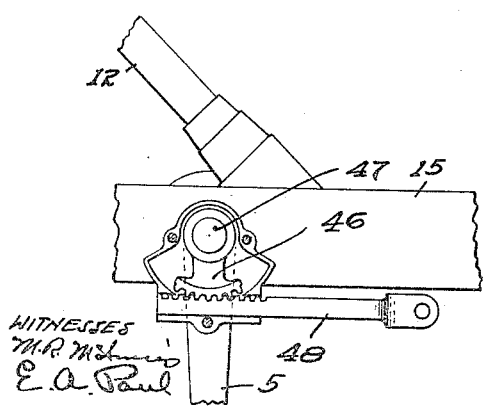

In the accompanying drawings forming part of this specification, Figure 1 is a side elevation of the forward portion of an automobile with our invention applied thereto, Fig. 2 is a detail sectional view, showing the connection between the lamp standards, Fig. 3 is a detail sectional view, illustrating the connection between the steering wheel and the mechanism for shifting the lights, Fig. 4 is a plan sectional view of a portion of the mechanism for shifting the lights, Fig. 5 is a detail sectional view illustrating a modified construction.

In the drawing, 2 represents an automobile of ordinary construction, having forward carrying wheels 3 and a steering rig 4 connected through an arm 5 with the steering post 6 of the car in any ordinary or preferred manner. We make no claim to this mechanism in this application, as it is the ordinary means for steering the car.

Referring now to Fig. 3, 7 represents the steering wheel, having a hub provided with a pinion 8 which meshes with a pinion 9 on the upper end of a shaft 10 which has bearings in a bracket 11 carried by the sleeve 12 which encircles the steering post.

13 is a bracket having jaws 14 to embrace the flange of the rail 15 of the car, provided with screws 16 for clamping the bracket on said rail. This bracket has a bearing 17 for the shaft 10 on which a beveled pinion 18 is mounted to mesh with a beveled gear 19 that is secured to a shaft 20 also having bearings in a bracket 13. A pinion 21 is secured on the shaft 20 and has teeth to mesh with a rack bar 22 that is mounted to slide at one end in a guide 23 in said bracket and at its opposite end is provided with an arm 24 pivoted at 25 and having a spring 26 for normally holding the arm in alinement with the rack bar.

A rock shaft 27 is mounted in bearings in the bracket 28 also secured to the rail 15 and a lever 29 is provided at one end of said rock shaft and projects upwardly therefrom and has a pin 30 to enter a recess 31 in said arm for normally connecting the rack bar 22 with the lever 29. A flexible connection 32 is provided for raising the arm 24 against the tension of the spring 26 and disengaging it temporarily from the pin 30 and thereby breaking the connection between the rack bar 22 and the lever 29. This arm is raised by the driver of the car when it is desired to disconnect the lamps from the steering post and will usually be done during the day when the lamps are not in use.

An arm 33 depends from the shaft 27 and at its lower end is pivotally connected to a rack bar 34 that is mounted to slide at its forward end in a guide 35 and has its teeth in mesh with the teeth of a gear 36 on an upright spindle 37. This spindle is mounted in bearings in a standard 38 that is secured to the frame of the car. On the top of the standard is a box 39 wherein gears 40 and 41 are arranged, the former mounted on the spindle 37 and the latter on a stud 42 of the light bracket 43. A rack bar 44 is arranged transversely of the car and has its teeth at one end in mesh with the gear 41 of one light bracket and at its opposite end with the teeth of a similar gear of the other light bracket, so that the two lights will be rotated simultaneously when the bar 44 is moved lengthwise. The gear 41 is introduced between the gear 40 and the rack bar to provide for rotary movement of the lights in the same direction. This movement will be positive and the mechanism being connected with the steering post, will be simultaneous with the movement of the wheel and the rays of light will be thrown to the right or the left, according to the direction in which the wheels may be turned.

We prefer to provide springs 45 between the arm 33 and the bracket 38 for the purpose of centering this arm in a vertical position and rotating the lights so that they will normally throw the rays straight ahead of the car.

In Fig. 5 we have shown a modified construction, which consists in mounting a gear segment 46 on the shaft 47 of the arm 5 to mesh with the teeth of a rack bar 48 which is connected with the lamp shifting mechanism in substantially the same manner as described with reference to Fig. 3.

In various ways the details of construction herein shown and described may be modified and still be within the scope of our invention.

We claim as our invention:

1. The combination, with the steering wheel of a power propelled vehicle, of headlights mounted on the vehicle, a rock shaft, arms mounted thereon, means operatively connecting one of said arms with said headlights, a rack bar geared to said steering wheel, a tilting arm mounted on said rack bar and having means for engagement with an arm of said rock shaft for completing the connection between said steering wheel and said headlights, said tilting arm when disengaged from said rock shaft arm breaking the connection between said steering wheel and headlights.

2. The combination, with the steering wheel of a power propelled vehicle, of headlights mounted thereon, a rock shaft, arms projecting upwardly and downwardly from said shaft, springs for normally holding said arms in a vertical position, means connecting the depending arm with said headlights, and mechanism geared to said steering wheel and having means for engagement with the upwardly projecting arm of said shaft for rocking said shaft when said wheel is operated.

3. The combination, with a vehicle frame and lamp standards mounted thereon, of lamp brackets having depending studs journaled in said standards, gears mounted on said studs, a rack bar having teeth in engagement with said gears for simultaneous rotary movement of said lamp brackets, a spindle mounted adjacent to one of said standards, a pinion on the upper end of said spindle meshing with the gear of the adjacent lamp stud, a steering post, a rack bar geared to said post, and mechanism operatively connecting said rack bar and the lower end of said spindle for rotating said studs and lamps simultaneously.

4. The combination, with the steering wheel of a power propeller vehicle, of a headlight mounted for rotation on said vehicle, a shaft geared to said wheel, a reciprocating rack bar geared to said shaft, a rock shaft having means for connection with said rack bar, and means operatively connecting said rock shaft with said headlight.

5. The combination, with the steering wheel of a power propelled vehicle, of a headlight mounted for rotation, a rock shaft having a depending lever operatively connected with said headlight, said shaft also having an upwardly projecting lever, a rack bar having means for connection with said upwardly projecting lever, and a gearing connecting said rack bar with said steering wheel.

6. The combination, with a power propelled vehicle frame, of headlights mounted for rotation thereon, a bracket secured to said frame, a stud mounted in said bracket, a beveled gear on said stud, a pinion also mounted on said stud, a rack bar meshing with said pinion, mechanism operatively connecting said rack bar with said headlights for simultaneous rotation thereof, a steering post and wheels therefor, a shaft mounted on said steering post and having a beveled pinion at its lower end meshing with the beveled gear of said stud, the upper end of said shaft being geared to said steering wheel.

7. The combination, with a frame, of lamp standards mounted thereon, lamp brackets having studs journaled in said standards, gears mounted on said studs, a rack bar having teeth meshing with said gears, an upright spindle geared at its upper end to one of said lamp studs and having bearings at its lower end adjacent to one of said standards, a rack bar geared to the lower end of said spindle, a steering post, and a mechanism operatively connecting said steering post with said rack bar for simultaneous rotation of said headlight brackets.

8. The combination, with a vehicle frame, of lamp standards mounted on the forward portion thereof, lamp brackets having studs journaled in said standards, gears mounted on said studs, a rack bar carried by said standards and having its teeth in engagement with the teeth of said gears, a spindle mounted in bearings adjacent to one of said standards and having a pinion at its upper end meshing with the gear of one of said studs, a pinion mounted on the lower end of said spindle, a rack bar meshing therewith, a rock shaft having means for connection with said rack bar, a steering post, and mechanism connecting said steering post with said rock shaft.

9. The combination, with the side rails of a vehicle, of upright standards secured thereon, lamp brackets having studs journaled in said standards and gears for said studs, a rack bar having guides in said standards and its teeth in mesh with the teeth of said gears, an upright spindle arranged adjacent to one of said standards and having bearings in the upper and lower ends of said standard, a pinion mounted on the lower end of said spindle, a rack bar meshing therewith, a rock shaft mounted on one of said side rails and having upwardly and downwardly projecting levers, means for normally holding said levers in a vertical position to center said lamp bracket studs, a steering wheel, and mechanism connecting said steering wheel with one of said rock shaft levers.

In witness whereof, we have hereunto set our hands this 3rd day of March, 1916.

HOWARD D. CAMMACK.
EDWARD V. VERHEYEN.

Copies of this patent may be obtained for five cents each, by addressing the "Commissioner of Patents, Washington, D. C."